(12) United States Patent
Packer

(10) Patent No.: US 7,733,367 B2
(45) Date of Patent: Jun. 8, 2010

(54) METHOD AND SYSTEM FOR AUDIO/VIDEO CAPTURING, STREAMING, RECORDING AND PLAYBACK

(76) Inventor: Lynn Kenneth Packer, 1088 Fairway Pl., North Salt Lake, UT (US) 84054-3373

( * ) Notice: Subject to any disclaimer, the term of this patent is extended or adjusted under 35 U.S.C. 154(b) by 950 days.

(21) Appl. No.: 11/358,616

(22) Filed: Feb. 21, 2006

(65) Prior Publication Data

US 2007/0195159 A1 Aug. 23, 2007

(51) Int. Cl.
*H04N 7/14* (2006.01)
(52) U.S. Cl. .................... 348/14.08; 348/14.12
(58) Field of Classification Search ............. 348/221, 348/222.1, 14.01–14.16, 211.12, 211.13; 386/35, 37, 66, 92, 107, 108, 109, 119, 123
See application file for complete search history.

(56) References Cited

U.S. PATENT DOCUMENTS

| | | | |
|---|---|---|---|
| 5,528,453 A | 6/1996 | Berman et al. | |
| RE35,658 E | 11/1997 | Jeppesen | |
| 5,684,714 A * | 11/1997 | Yogeshwar et al. | 370/521 |
| 5,701,153 A | 12/1997 | Reichek et al. | |
| 5,729,741 A | 3/1998 | Liaguno et al. | |
| 5,832,171 A | 11/1998 | Heist | |
| 5,867,654 A | 2/1999 | Ludwig et al. | |
| 6,163,798 A * | 12/2000 | Frank | 709/204 |
| 6,249,281 B1 * | 6/2001 | Chen et al. | 715/753 |
| 6,392,694 B1 | 5/2002 | Bianchi | |
| 6,677,979 B1 * | 1/2004 | Westfield | 348/14.12 |
| 6,728,753 B1 * | 4/2004 | Parasnis et al. | 709/203 |
| 7,092,002 B2 * | 8/2006 | Ferren et al. | 348/14.08 |
| 7,149,973 B2 | 12/2006 | Dias et al. | |
| 7,330,875 B1 * | 2/2008 | Parasnis et al. | 709/204 |
| 7,356,763 B2 * | 4/2008 | Lin et al. | 715/205 |
| 2002/0126142 A1 * | 9/2002 | Hodgkinson | 345/719 |
| 2003/0078973 A1 | 4/2003 | Przekop et al. | |
| 2004/0109014 A1 * | 6/2004 | Henderson | 345/716 |
| 2004/0117819 A1 * | 6/2004 | Yu | 725/32 |
| 2004/0263636 A1 * | 12/2004 | Cutler et al. | 348/211.12 |

(Continued)

OTHER PUBLICATIONS

CourtSmart Digital Systems, Inc. <http://www.courtsmart.com/htm/home.htm>, pp. 1-2.

(Continued)

*Primary Examiner*—Lin Ye
*Assistant Examiner*—Don Nguyen

(57) ABSTRACT

A system and method for audio/visual displaying, capturing, streaming, recording and playback is disclosed. The invention has many applications including distance learning and video capture of legal proceedings. The video deposition embodiment of the present invention facilitates paperless depositions by allowing the simultaneous, single channel recording and streaming of a deponent (witness) and his or her exhibits during a litigation deposition or similar process, such as courtroom record-making and teleconferencing. One aspect of the present invention is the paperless, digital display of rich media exhibits at the deposition on a large-format display such as an LCD, DLP, or plasma screen that is positioned next to the deponent, facing the camera, displaying exhibits in a digital (paperless) format. Another aspect of the present invention is the capability of video recording, video teleconference (VTC) and/or video streaming the combined images of both the deponent and the displayed exhibits in a single frame-of-view permitting transmission of a single video signal for storing, streaming, replaying and viewing, all in a single window.

32 Claims, 7 Drawing Sheets

U.S. PATENT DOCUMENTS

| | | | |
|---|---|---|---|
| 2005/0097613 | A1 | 5/2005 | Ulate et al. |
| 2005/0177795 | A1 | 8/2005 | Weiss et al. |
| 2005/0243168 | A1* | 11/2005 | Cutler ................... 348/14.12 |
| 2006/0005136 | A1* | 1/2006 | Wallick et al. .............. 715/726 |

OTHER PUBLICATIONS

Javs: Products: "Introducing the Digital Video Courtroom." <http://www.javs.com/products/index.htm.>, pp. 1-3.

Courtroom Connect : Products and Services. <http://www.courtroomconnect.com/about_us>, pp. 1-2.

Depocast.com : Viewing Depositions Online. <http://depocast.com/info/viewing.asp>, pp. 1-2.

Communitek Video Systems, Inc: "EBT Recording System." <http://www.communitekvideo.com/EBT/Frames/EBTIntro.htm>, pp. 1.

Packer, Lynn. "Integrated Technologies in the legal Field," *The Court Reporter: Integrated Technologies in the legal Field.* Summer 2005, pp. 5.

Packer, Lynn. "Court Record and Evidence Presentation Technologies in Utah Courtrooms: Recommendations for Judicial Council's Standing ." Powerpoint presentation, Dec. 8, 2004, pp. 1-3.

Packer, Lynn. "AAERT Presentation: Reinventing Court Reporting." Powerpoint presentation, Jun. 17, 2005, pp. 1-15.

Vonder Haar, Steve. "Eyes on the Enterprise: Brave New Platforms." Streaming Media Magazine, Oct./Nov. 2008, via http://www.streamingmedia.com/article.asp?id=10755.

Riismandel, Paul. "Rich Media Presentation Systems for Education and the Enterprise." Streaming Media Magazine, Feb./Mar. 2008, via http://www.streamingmedia.com/article.asp?id=10062.

Mertens, R., Friedland, G. & Krüger, M. (2006). "To See or Not To See: Layout Constraints, the Split Attention Problem and their Implications for the Design of Web Lecture Interfaces." In T. Reeves & S. Yamashita (Eds.), *Proceedings of World Conference on E-Learning in Corporate, Government, Healthcare, and Higher Education 2006* (pp. 2937-2943), Chesapeake, VA: AACE.

Law Technology, Law.com's Legal Technology Blog, "Video Depositions." Apr. 1, 2008. Via http://legaltech.law.com/my_weblog/2008/04/trial-consultan.html.

Blumenstyk, Goldie. "Colleges Wonder if Microsoft is their Next Competitor." Chronicle of Higher Education, Apr. 24, 1998, via http://chronicle.com/data/articles.dir/art-44.dir/issue-33.dir/33a03301.htm.

* cited by examiner

2-Shot: Witness and Exhibit 1-shot: Exhibit

1-Shot: Deponent

3-Shot: Witness, Exhibit & Attorney

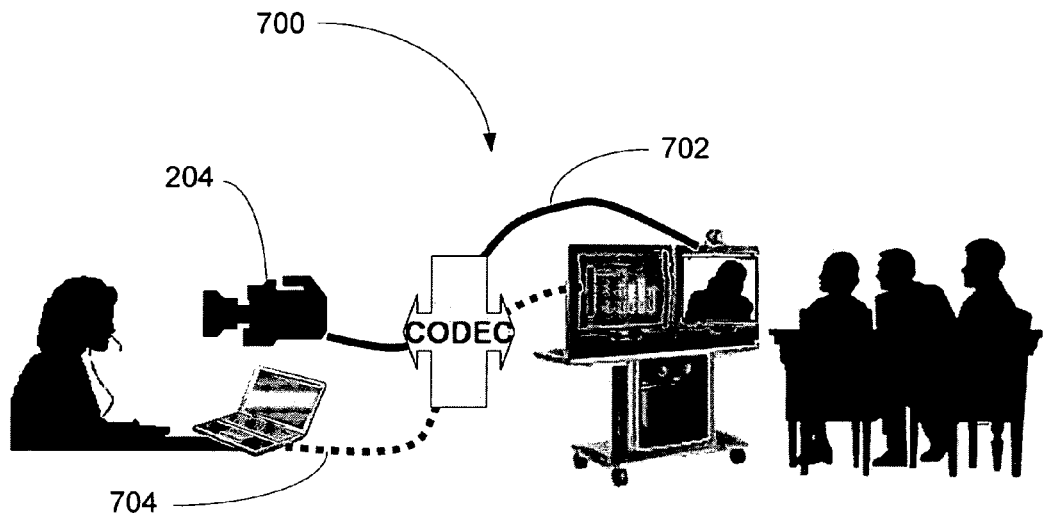
FIG. 7A (Prior Art)
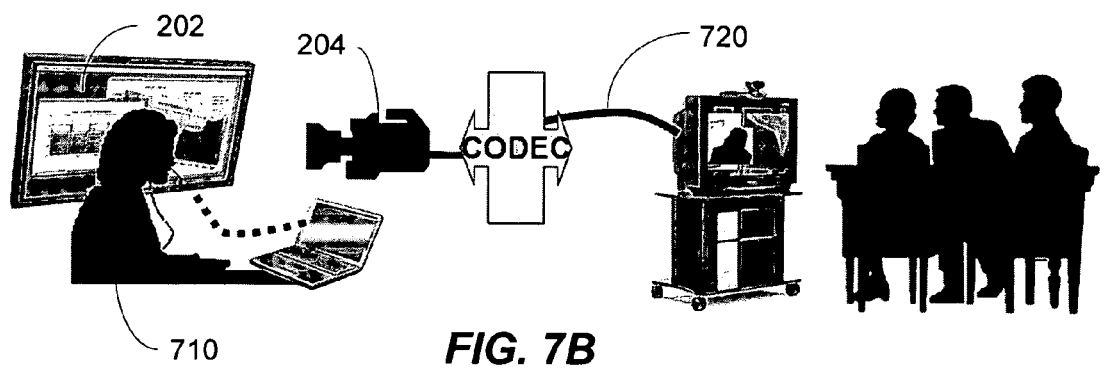
FIG. 7B

METHOD AND SYSTEM FOR AUDIO/VIDEO CAPTURING, STREAMING, RECORDING AND PLAYBACK

BACKGROUND OF THE INVENTION

1. Field of the Invention

This invention relates generally to systems for recording audio and video (A/V) and for playback of same. More particularly, the invention relates to a method and system for A/V capturing, recording, streaming, videoconferencing and for live and on-demand playback. The capture function of the system and method is often referred to as "event capture" generally and sometimes more specifically as, "lecture capture" and "deposition capture" among types of events that can be AV captured for recording and/or streaming and/or videoconferencing.

2. Description of Related Art

This invention is to all types of event capture but perhaps the most demanding is the capture of courtroom and deposition proceedings where the captured, recorder and/or streamed and/or videoconferenced record is often an "official" record, demanding perhaps the highest quality of all event capture. Litigation of any sort in the United Stated is widely considered too expensive and too slow to reach resolution. Generally, the legal industry has been slow to adopt technology to improve productivity and increase access. Electronic filing of pleadings and motions is becoming more commonplace. However, the legal industry's use of what little video it now deploys is largely inefficient. For example, it is not uncommon for some courtrooms that have begun using video to have separate cameras for making (1) an official record, (2) security, and (3) videoconferencing, thus resulting in duplication, financial waste and needless complexity. In another example, a deposition where all available legal technology is deployed, separate rather than integrated systems are typically brought in for (1) making the video of the deposition, (2) videoconferencing in a witness or attorney at a remote site, and (3) evidence presentation (systems occasionally used in trial but rarely during depositions). Moreover, shorthand stenographic equipment may also be brought in to make yet another record. Some stenographers have hardware and software allowing the text transcript itself to be fed in real-time for viewing by parties on and off site.

Most depositions today are still recorded by stenographic court reporters who make the record in shorthand, often with the aid of computer-aided-transcription (CAT) machines (steno keypads connected to a computer and special software). A lesser number of those stenographic reporters are also trained and equipped to offer real-time reporting, i.e., their computers output real-time transcriptions of what is being said to attorneys' and judges' laptops during depositions, hearings and trials.

A minority of depositions today are videotaped, despite the fact that a video record is more accurate and cheaper to make than a stenographic record. In addition, a video deposition is a much better tool for hearings and trials because the body language of the deponent is visible and the inflection in the responses can be heard. Such nuances are typically lost when only a stenographic record is available. It is also typically the case that when depositions are captured on video, it is in addition to, rather than in lieu of, stenographic reporting, despite the fact that federal and many state rules permit electronic instead of stenographic recording. This represents needless duplication and expense for clients.

Some trials are considered "paperless." The term "paperless trial" describes the electronic presentation of evidence on courtroom displays rather than on paper. A paperless trial does not mean the complete absence of paper or that digital documents are never used in a paper trial. Rather, in a paperless trial as of this writing, electronic methods are the primary method of storing and showing exhibits with paper as a supplement or backup, e.g., exhibit binders, or available on-demand via a printer. Experts would generally agree that the digital presentation of evidence during trials can dramatically cut trial time, perhaps by as much as a third. The same would hold true with other legal proceedings, such as depositions.

Almost no depositions taken today are paperless and, thus, do not feature the digital presentation of evidence, e.g., documents, timelines, photos, charts and video clips. Most exhibits are usually copies of documents, shown to the deponent in paper format. Occasionally, charts and diagrams might be displayed on an easel or whiteboard, paper photos might be shown, and video might be played from a conventional video cassette recorder (VCR) and associated monitor. Interestingly, more and more discovery documents are either generated or stored as digital documents only to be printed back to paper for depositions and trials.

The use of edited deposition video testimony instead of live witnesses during a trial occurs very infrequently. It may be the case that if more depositions were video recorded, and if more witnesses appeared electronically in trial (digital testimony, edited down to essential testimony), trial duration might be cut even further, in addition to time savings through paperless evidence presentation.

Most depositions in the United States are manually, stenographically recorded as text-only by court reporters. Conventional video cameras and tape decks (occasionally with CD or DVD digital backup) are used to record the relatively few depositions that are conventional video-recorded depositions. A mere fraction of those video recorded depositions use additional equipment to stream the signal in real time (live) for viewing at remote sites. When streamed, which is rare, most often only the video and audio of the deponent (the so-called talking head) is streamed live and not the exhibits. The exhibits are usually faxed, mailed or emailed before the proceeding takes place and viewed during the proceeding on paper or digitally on a second display or window separate from the deponent's display. If both the deponent video and exhibits are streamed simultaneously—a rare occurrence—the two are usually transmitted on separate channels and are displayed, in separate windows or on separate screens at the remote site. For example, conventional transmission of deponent video and exhibit video might be displayed on two screens (see FIG. 4A), a split screen (see FIG. 4B), tiled (picture-in-picture, see FIG. 4C), or a three window version for displaying (1) the talking head, (2) the exhibits and (3) scrolling text of the deposition from a stenographer (see FIG. 4D). Note that some software tools tailored to the legal industry for video deposition playback, add that third window to include scrolling text of the deposition. Examples of such software tools for video depositions that have this or a similar feature include: DepositionDirector™, available from in Data Corporation, Gilbert, Ariz., and Visionary Viewer™, available from Visionary Legal Technologies, Dallas, Tex. The two-channel transmission of conventional video depositions is obviously more expensive than a single video feed, adds to the complexity of setup and use, and is displayed in disjointed fashion at the end point, requiring viewers' eyes to dart back and forth among windows.

Thus, it would be highly advantageous to have a method or system wherein the deponent is positioned next to a display which is simultaneously viewable by those on-site in the room and by anyone off-site watching via streamed video in real-time or afterwards, on demand, via a recording. Furthermore, the combination of electronic document presentation and greater use of edited witness testimony could combine to cut the length of a typical trial.

SUMMARY OF THE INVENTION

An embodiment of a method for audio/video (A/V) capturing, streaming, recording and playback is disclosed. The method may include framing at least one person and a video display in a camera field of view, selectively displaying legible rich media (another term for multimedia and may include text, photos, exhibits, slides, video, etc.) on the video display, capturing A/V signals of at least one person and the rich media using a camera and generating a single A/V feed and the single A/V feed configured for recording, playback and streaming for viewing in a single-window format or interface.

An embodiment of an audio/video (A/V) capturing, streaming, recording and playback system is also disclosed. The system may include a video display, a video camera configured for capturing AN signals of a person and the video display within a field of view of the video camera and the video display configured to selectively display legible rich media.

An embodiment of a method for audio/visual (A/V) capturing, streaming, recording and playback of witness testimony is also disclosed. The method may include providing an A/V capturing, streaming, recording and playback system, positioning a witness and the exhibit monitor (display) within the field of view of the video camera, selectively displaying the exhibits on the exhibit monitor, selectively questioning the witness in reference to the selectively displayed exhibits and capturing A/V testimony from the witness and the selectively displayed exhibits.

Additional features and advantages of the invention will be set forth in the description that follows, and in part will be apparent from the description, or may be learned by the practice of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

FIGS. 7A-B are simplified diagrams comparing a conventional two-channel video deposition/presentation system with an embodiment of the single video channel system of the present invention.

DETAILED DESCRIPTION

Embodiments of the present invention have particular utility in the context of legal depositions, but have many other applications as well, such as distance learning. Embodiments of the present invention combine evidence presentation, video capturing, recording, streaming and videoconferencing and further eliminate the need for unnecessary, expensive and less accurate stenographic reporting. Even though courtroom technology is considerably more advanced than that used for depositions, existing courtroom technology is still crude relative to other industries. Thus, a system embodiment of the present invention may be ideal for the many state courtrooms that now have little or no technology and may replace existing, poorly designed systems that are now in most federal courts. By combining the power of video and digital (paperless) evidence display, the duration of discovery and trials may be dramatically reduced. Furthermore, litigation results may be enhanced by use of the present invention, because judges and juries will better comprehend the evidence.

As used herein, the terms "A/V signals", "video" and "video recording" are meant to encompass video and audio signals combined together, unless otherwise apparent from the context. The term "video recording" is inclusive of any suitable computer media for performing the recording, including tape (VHS, DV), compact disk (CD), digital versatile disk (DVD), magneto-optic, hard disk drives, solid-state memory and any other suitable media for recording video data.

Figure 1:
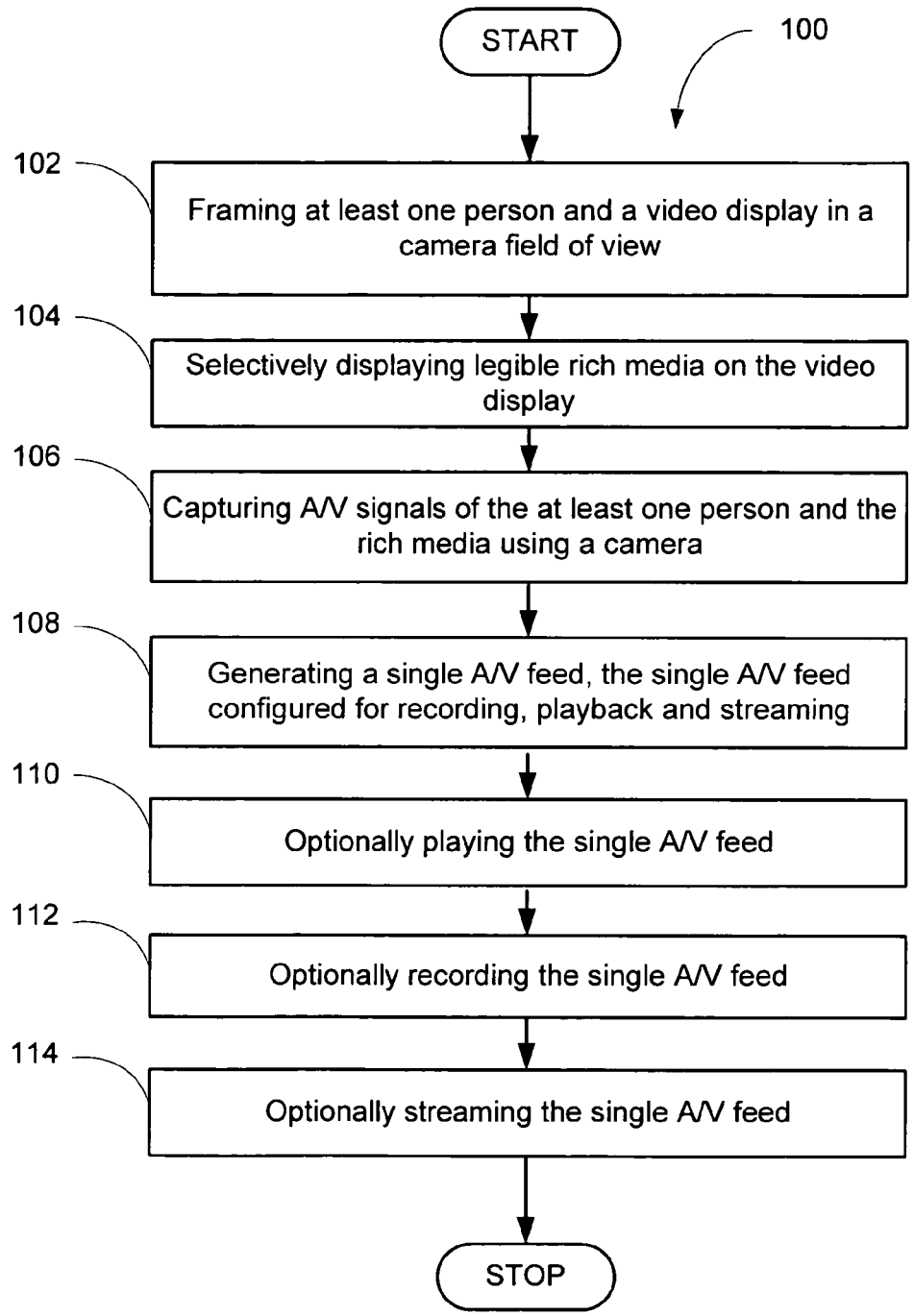
FIG. 1 is a flow chart of an embodiment of a method for audio/video (A/V) capturing, streaming, recording and playback according to the present invention.

FIG. 1 is a flow chart of an embodiment of a method 100 for audio/video (A/V), capturing, streaming, recording and playback, according to the present invention. Method 100 may include framing 102 at least one person and a video display in a camera field of view and selectively displaying 104 legible rich media on the video display (the evidence display part of the method). Method 100 may further include capturing 106 A/V signals of at least one person and the rich media using a camera. Method 100 may further include generating 108 a single A/V feed, the single A/V feed being configured for recording, playback and streaming, i.e., the recording/streaming part of the method embodiments of the present invention.

Method 100 may further include optionally playing 110 the single A/V feed. Playing 110 the single A/V feed may comprise playing the single A/V feed on a video display and speaker system. Playing 110 the single A/V feed may be distinct from streaming in that playing 110 may be from a recording that is time delayed. According to an embodiment of the present invention, the video display and speaker system may include suitable hardware and software for decompressing the single A/V feed and playing the video in a window on a video display and the audio signal(s) on the speaker system. According to one embodiment, the video display and speaker system may be a multimedia computer in desktop, laptop, notebook, or handheld configuration.

Method 100 may further include optionally recording 112 the single A/V feed for storage and on-demand playback according to an embodiment of the present invention. Recording 112 the single A/V feed may be accomplished using any suitable video recording hardware using any suitable recording media, including but not limited to: hard disk drives, analog video tape, digital video tape, digital versatile disk (DVD), or solid state-memory.

Method 100 may further include optionally streaming 114 the single A/V feed live and/or on-demand, according to an embodiment of the present invention. Streaming 114 the single A/V feed may be accomplished with or without recording first. This particular embodiment allows live (or real-time) streaming of the video content for remote distribution or transmission of the video content for viewing and recording at remote sites.

According to another embodiment of method 100, framing 102 at least one person and a video display in a camera field of view may include framing a deponent with the video display configured to appear over-the-shoulder of the deponent for simultaneously and legibly displaying selected rich media and the deponent within the video camera field of view. According to yet another embodiment of method 100, the video display may further be configured for displaying magnified portions and highlighting portions of the selected rich media. According to still another embodiment of method 100, the selected rich media may be legal proceeding exhibits, for example and not by way of limitation, legal documents, deposition or trial exhibits, video and audio recordings and magnified portions or highlighted portions of same.

According to still another embodiment of method 100, framing 102 may include adjusting relative placement of at least one person and the video display within the camera field of view. According to an alternative embodiment, framing 102 may include adjusting the focal length of the camera lens, either by the positioning of a camera with a fixed lens or by adjusting the settings of a pan/tilt/zoom (PTZ) lens as seen through the viewfinder. According to a further embodiment of method 100, framing 102 at least one person and the video display in the single video field of view may include configuring the video display to appear over the shoulder of at least one person. An important aspect of the framing 102 feature of method 100 is that both the person and the legible rich media are capable of being captured by the camera in a single channel of video and, thus, does not require a separate data channel for the capture of the rich media.

According to an embodiment of method 100, generating 108 a single A/V feed may comprise generating a digital A/V feed. A digital A/V feed, may be compressed digital video that is suitable for transmission over computer networks. Compressed digital video is especially advantageous because it reduces the required transmission bandwidth for live streaming of the video content. According to another embodiment, method 100 may further include viewing the single A/V feed at a remote location (not shown in FIG. 1). According to still further embodiments, method 100 may include providing the single A/V feed as video on demand and/or as streaming video, depending on the particular application.

According to still another embodiment of method 100, optionally recording 112 A/V signals may include recording digital A/V signals. Alternatively, analog A/V signals may be recorded and then converted to digital A/V signals at some later point in time according to yet another embodiment of the present invention. According to an embodiment of method 100, optionally playing 110 the single A/V feed may include playing the single A/V feed on a video display and speaker system.

According to still another embodiment, method 100 may further include transmitting the single A/V feed to remote locations. Transmission of the single A/V feed to remote locations may include transmitting the single A/V feed over a network. The network may be any suitable network, for example and not by way of limitation, a local area network, a wide area network, any Internet Protocol-based (IP-based) network, an Intranet, a private Internet, a public Internet (see 220 in FIG. 2 and related discussion below), a wireless network with sufficient bandwidth and any other suitable network capable of video data transmission. The network may be computer, cable, or satellite based infrastructure, but suitable for delivering A/V data, compressed or otherwise according to various embodiments of the present invention.

Figure 2:
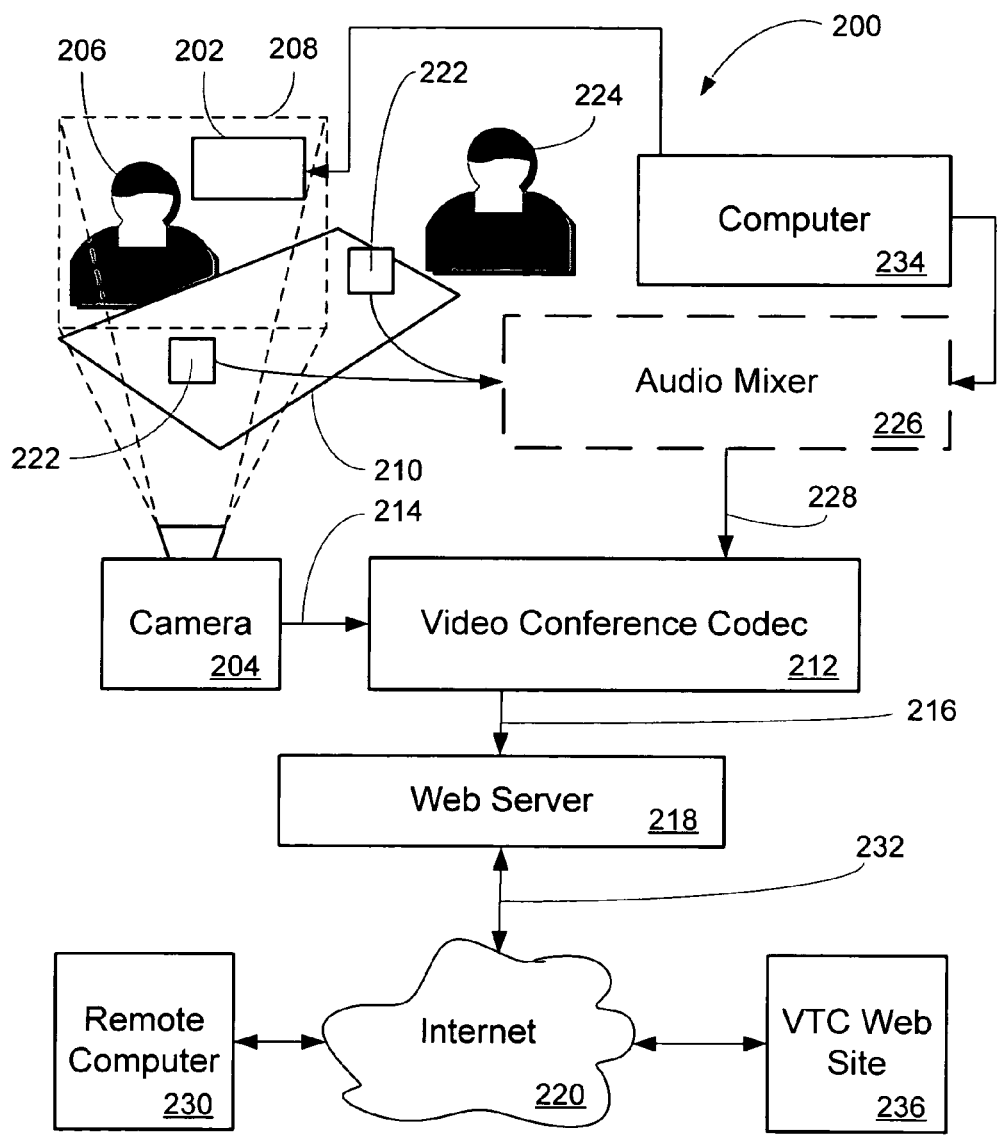
FIG. 2 is a block diagram of an embodiment of an A/V capturing, streaming, recording and playback system according to the present invention.

FIG. 2 is a block diagram of an embodiment of an A/V capturing, streaming, recording and playback system 200 according to the present invention. System 200 as shown in FIG. 2 is not necessarily shown to scale. System 200 may include a video display 202 and a video camera 204 configured for capturing A/V signals of a person 206 and the video display 202 within a single frame or field of view 208 of the video camera 204. The person 206 and video display 202 may be selectively positioned around a table 210, or standing (not shown in FIG. 2), depending on the application for system 200. The video display 202 may be configured to selectively display legible rich media on its video screen within the field of view 208 of video camera 204.

As shown in FIG. 2, the video display 202 may be configured to appear over-the-shoulder of the person within the field of view 208. Video display 202 is carefully chosen to provide high legibility of the rich media. Rich media may be rich media files having static graphic images, full motion video and text documents (original or scanned). Suitably connected speaker systems (not shown in FIG. 2) may be used in combination with video display 202 for audio sound files to be presented along with the graphically visual rich media. According to a particular application of system 200 in the context of legal proceedings, rich media displayed on video display 202 may be legal proceeding exhibits, for example and not by way of limitation, legal documents, deposition or trial exhibits, text, graphics, charts, timelines, video and audio recordings and magnified portions or highlighted portions of same.

Presently preferred embodiments of video displays 202 are wide screen format (16:9 aspect ratio), using any suitable flat panel or projected display technology including but not limited to cathode ray tube (CRT), gas plasma, digital light processor (DLP) display and liquid crystal display (LCD). However, the standard 4:3 aspect ratios of any display technology are also suitable for video display 202 according to alternative embodiments of the present invention.

System 200 may further include a computer 234 connected to video display 202 for selectively controlling the documents, exhibits, etc., that are displayed on video display 202 according to yet another embodiment of the present invention. Any suitable video interface may be used to connect computer 234 to video display 202, including but not limited to HD15 or HDMI cables and interfaces. Of course, it will be readily apparent to one of skill in the art that multiple computers (not shown) and other video sources (not shown) could be connected using mechanical or electrical switches. According to still a further embodiment of the present invention, the video source (computer 234 or other video source) output may also be connected to video teleconference codec 212 or another streaming device (not shown) for the transmission of full-screen versions of the display image. According to still a further embodiment of the present invention, the computer 234 (or other video source) may include audio connection to an on-site amplifier and/or audio mixer 226 to become part of the recorded and/or streamed signal.

System 200 may further include a video teleconference (VTC) compressor/decompressor (codec) 212 configured for receiving the captured A/V signals 214 from the video camera 204 and compressing the captured A/V signals 214 to obtain a single A/V feed 216 according to an embodiment of the present invention. Note that the video teleconference (VTC) hardware is often referred to as a "codec" and should not to be confused with "software codecs" that simply compress video files. System 200 may further include a web server 218 in communication with the video teleconference codec 212 and configured for receiving the single A/V feed 216 according to an embodiment of the present invention. Web server 218 may further be configured for providing the single A/V feed 216 as a downloadable video on demand file 232 and/or transmitting the single A/V feed 216 as streaming video 232. Web server 218 may be connected to a network for providing the video on demand or streaming video. The network may be any suitable network, for example and not by way of limitation: a local area network (LAN), a wide area network (WAN), an Intranet, a private Internet, a public Internet 220 (as shown in FIG. 2), or even a wireless network. The use or inclusion of high bandwidth networks are presently preferred embodiments of the present invention for distribution of video data even when compressed.

System 200 may further include a plurality of microphones 222 for picking up audio from person 206 or a second person 224 according to yet another embodiment of the present invention. Microphones 222 may be desk, lavaliere, boom, headset, boundary, or a combination thereof, according to various embodiments of the present invention. Of course any number of persons may be providing audio to a microphone 222. System 200 may further include an audio mixer 226 in communication with the plurality of microphones 222 (two shown in FIG. 2) and the video teleconference codec 212 according to still another embodiment of the present invention. Audio mixer 226 may be hardware and/or software-based, according to embodiments of the present invention. Audio mixer 226 may be configured for receiving a plurality of input audio signals from the plurality of microphones 222 and generating mixed audio channels 228 for compression by video teleconference codec 212 into the single A/V feed 216. The audio mixer 226 may be configured with any number of input audio channel capacity and configured to output the mixed audio channels 228.

System 200 may further include at least one remote computer 230 in communication with a network as described above, e.g., an Internet 220 as shown in FIG. 2. Remote computer 230 may be configured for receiving the single A/V feed and selectively decompressing and playing the A/V feed. Remote computer 230 may be any suitable computer capable of receiving a streaming video 232 or a suitably compressed video file (video on demand 232) of any format, e.g., Windows Media File™ (.wmf), and decompressing the compressed video file and displaying and recording same with or without audio signals. Remote computer 230 may be installed with suitable software, e.g., Windows Media Player™ and a video display and speaker system for viewing and recording the A/V feed. According to an alternative embodiment of system 200, remote computer 230 may be a dedicated video receiver system (not shown in FIG. 2) having a video receiver (not shown in FIG. 2) and television (not shown in FIG. 2) or computer display (not shown in FIG. 2). Multimedia computers of any sort, size or form factor are particularly suitable embodiments of remote computer 230 according to the present invention.

Figure 3:
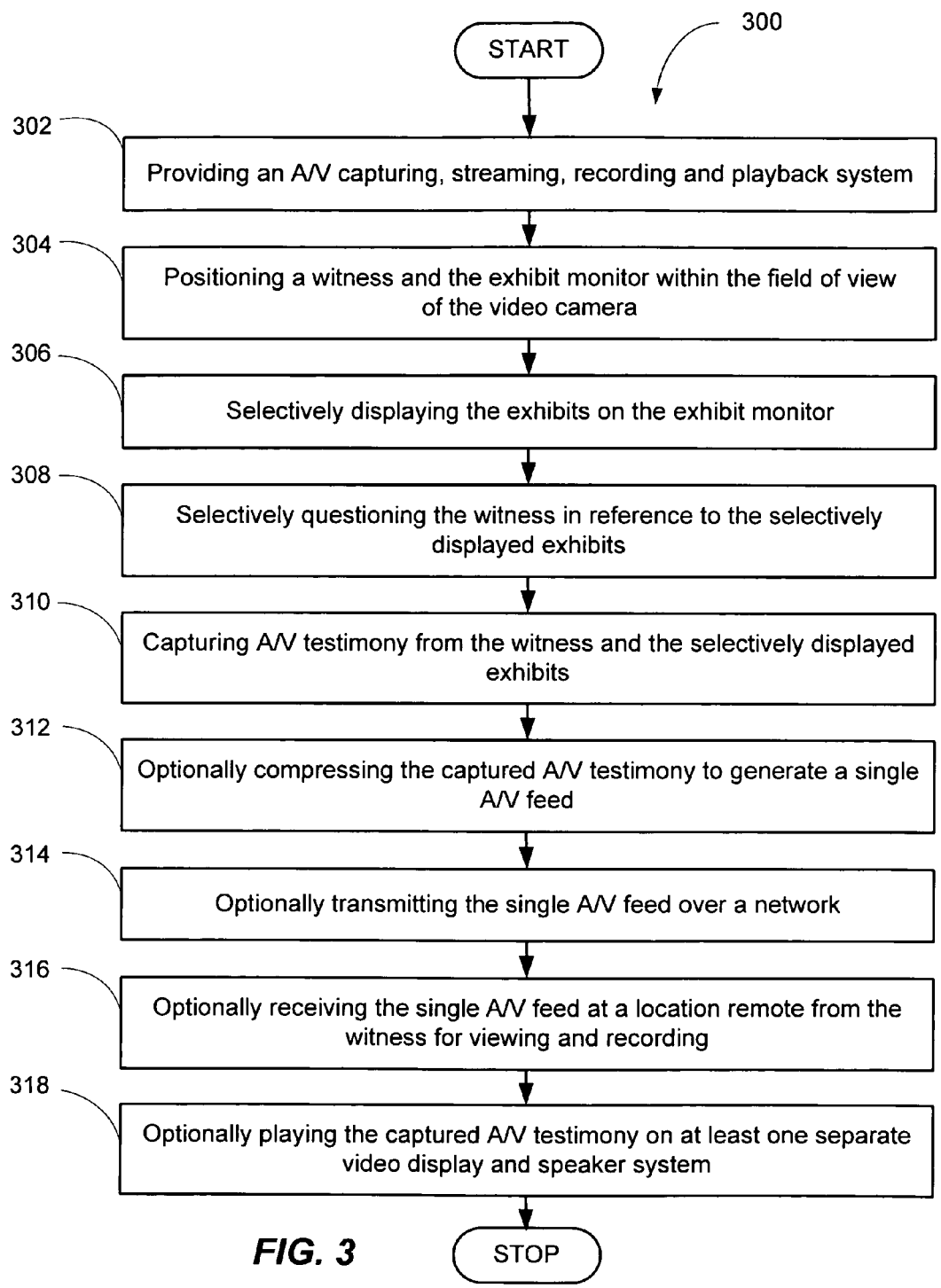
FIG. 3 is a flow chart of an embodiment of a method for A/V capturing, streaming, recording and playback of witness testimony, according to the present invention.
Figure 4A:
FIG. 4A is a diagram of a conventional video deposition utilizing two channels of electronic data, the first channel of video being used for the deponent and the second channel of video being used for exhibit display in a two video screen or monitor configuration.
Figure 4B:
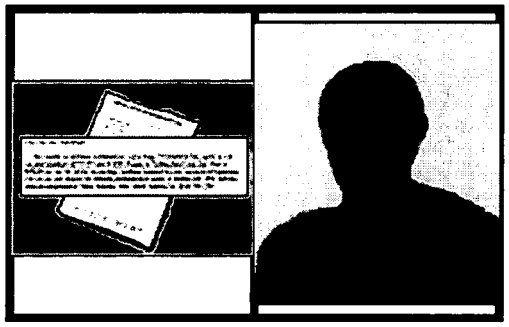
FIG. 4B is a diagram of a conventional video deposition utilizing two channels of data, the first channel of video for the deponent and the second channel of data for exhibit display in a split screen configuration.
Figure 4C:
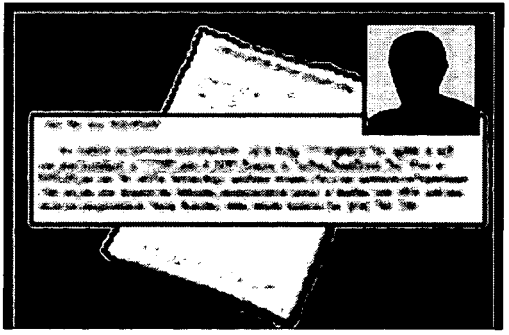
FIG. 4C is a diagram of a conventional video deposition utilizing two channels of data, the first channel of video for the deponent and the second channel of data for exhibit display in a picture-in-picture (PIP) screen configuration.
Figure 4D:
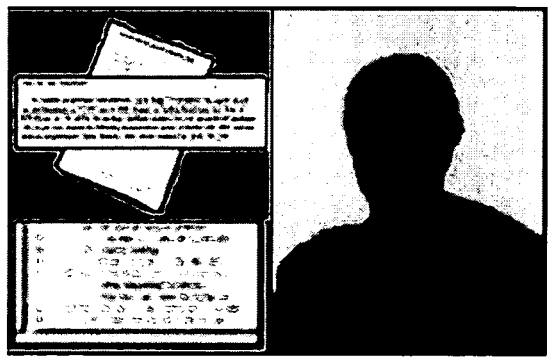
FIG. 4D is a diagram of a conventional video deposition utilizing a three screen configuration for displaying (1) the talking head, (2) the exhibits and (3) scrolling text of the deposition from a stenographer.

FIG. 3 is a flow chart of an embodiment of a method for A/V capturing, streaming, recording and playback of witness testimony, according to the present invention. Method 300 may include providing 302 an A/V capturing, streaming, recording and playback system according to an embodiment of the present invention. The system may include an exhibit monitor (not in FIG. 3, but see video display 202 in FIG. 2) configured to selectively display legible rich media exhibits, a video camera (not in FIG. 3, but see 204 in FIG. 2) configured for capturing A/V signals of a witness and the exhibit monitor within a field of view of the video camera and the exhibit monitor configured for selectively displaying exhibits that are legible in the A/V recording, according to an embodiment of method 300. Method 300 may further include positioning 304 a witness and the exhibit monitor within the field of view of the video camera, according to the present invention. Method 300 may further include selectively displaying 306 the exhibits on the exhibit monitor, according to the present invention. Method 300 may further include selectively questioning 308 the witness in reference to the selectively displayed exhibits, according to the present invention. Method 300 may further include capturing 310 A/V testimony from the witness and the selectively displayed exhibits, according to the present invention. Method 300 may further include optionally recording the deposition or presentation on-site in the same room or at a server via a network connection. The recording device may be a part of or in addition to a VTC codec.

Method 300 may further include optionally compressing 312 the captured A/V testimony to generate a single A/V feed, according to the present invention. Method 300 may further include optionally transmitting 314 the single A/V feed over a network, according to the present invention. Method 300 may further include optionally receiving 316 the single A/V feed at a location remote from the witness, according to the present invention. Method 300 may further include optionally playing 318 the captured A/V testimony on at least one separate video display and speaker system, according to the present invention.

According to an embodiment of method 300, optionally receiving 316 the single AN feed may comprise downloading video on demand for selective playback. According to another embodiment of method 300, optionally receiving the single A/V feed may comprise receiving streaming video for immediate playing or recording and selective playback.

According to yet another embodiment of method 300, providing 302 an A/V capturing, streaming, recording and playback system may further comprise providing a video teleconference codec (not in FIG. 3, but see 212 in FIG. 2) configured for receiving the captured A/V testimony from the video camera and compressing the captured A/V testimony to obtain a single A/V feed. According to still another embodiment of method 300, providing 302 an A/V capturing, streaming, recording and playback system, may further comprise providing a web server in communication with the video teleconference codec (see 212 in FIG. 2) and configured for receiving the single A/V feed, the web server further configured for at least one of the following: providing the single A/V feed as a downloadable video on demand file, or transmitting the single A/V feed as streaming video over a network. According to yet another embodiment of method 300, providing 302 an A/V capturing, streaming, recording and playback system may further comprise providing a multimedia computer (see, e.g., remote computer 230 in FIG. 2) for playing the single A/V feed.

Other embodiments of the present invention relate to features of the system for recording of the A/V feed audio. One embodiment involves the use of a courtroom-style audio visual recorder in connection with or separate from any VTC codec. Unlike many other VTC recorders, courtroom AV recorders have been optimized for legal use with features such as minimum 4-channel input, confidence monitoring, playback while recording and log-noting. Among such recorders are PC-based systems such as VoiceIQ™, ForTheeRecord™, TheReporter™, Veriscribe™, ComLog™, Liberty™ and appliance systems such as Jefferson Audio Video™ (JAVS™) and CourtSmart™. Users of the present system and method embodiments may want to save money and complexity by using a courtroom-style recorder if they use a VTC system without a built-in recording system, or may want a back-up recording system to the VTC recorder or want to omit VTC capability altogether.

Further embodiments of the present invention will be detailed in the context of a single particular application for the invention. That application is in the taking of video testimony for legal proceedings, particularly a deposition involving a person being deposed, i.e., the deponent, and rich media in the form of deposition exhibits. Of course, it will be readily apparent to one of skill in the art and others that applications for the method and system of the present invention go far beyond the video deposition application, for example and not by way of limitation, distance learning and rich media presentations are other applications for the present invention.

Embodiments of the present invention may be used to capture both the deponent and deposition exhibits in the same physical space in real-time on a single data stream, not two or three, as in conventional systems for displaying two or three data streams simultaneously. Furthermore, both the person and rich media appear fully connected at the remote site on a single screen replicating the way they are seen on site in front of a camera. The present invention lowers the cost of storing and transmitting the audio/video (A/V) data and makes the output, i.e., the complete deposition record, more comprehensible at the viewing end.

One embodiment of the present invention is a single-camera conference-room style system for displaying legal evidence, capturing, recording, videoconferencing and streaming video depositions. According to this system embodiment, the lens of a video camera is positioned facing the deponent and evidence display and the shot is framed by adjusting pan/tilt/zoom and the physical position of the video camera. The video camera may be connected to a videoconference codec according to another embodiment of the present invention. The deponent and both counsel may each have lavaliere microphones connected to a 4-track audio mixer that is connected to the videoconference codec according to a further embodiment of the present invention. According to an alternative embodiment, Video teleconference (VTC) "boundary" desk microphones may be used instead of the lavaliere microphones in the previous embodiment. Video and/or audio confidence monitoring, i.e., at least one display or headset indicating what is actually being recorded and/or streamed, is an optional feature according to yet another embodiment of the system.

According to a system embodiment, the questioning attorney (attorney taking the deposition) may be seated across from the deponent with the exhibit video display being between the deponent and questioning attorney. According to yet another embodiment of the system, the questioning attorney may have a laptop or other computer connected to the exhibit video display. This allows the questioning attorney to selectively display legal documents, charts or other exhibits relevant to the line of questioning and the case in point. The non-questioning attorney (attorney defending the deposition) may be seated on the other side of the witness. The non-questioning (defending) attorney may also have a laptop or other computer connected to the exhibit (or evidence) display via a manual switch or electronic control such as, e.g., an AMX switching device. This feature allows the non-questioning attorney to selectively display the exhibits during his or her questioning of the deponent. According to an alternative embodiment, the non-questioning attorney's computer may be connected to a network, e.g., Intranet, local area network (LAN), a public Internet or nothing at all (standalone). When it becomes time for any other attorney (non-questioning or otherwise) to question the witness, the attorneys trade places thus allowing the non-questioning attorney to assume the questioning attorney position. This embodiment preserves the system setup and, thus, does not require repositioning of the camera and exhibit display.

If a recording device is not built into the video camera or videoconferencing box (videoconference codec), a suitable recording device may be employed along with a backup audio system according to an embodiment of the present invention. Provision may also be made for counsel to make their own A/V recordings, according to still another embodiment. To make certain the deposition is being recorded, the system may at a minimum include audio confidence monitoring of the recorded data. According to still a further embodiment of the present invention, an amplified speaker may be provided to hear someone at a remote site and/or audio files that are played as part of the evidence presentation at the site of the deposition. If an audio file is played from a laptop computer for example, then the laptop audio output may be connected to the audio mixer according to another embodiment of the present invention.

According to yet another embodiment, the videoconference codec 212 may be connected to an external network (as variously described above), so that persons at remote sites can view the output A/V feed. According to still a further embodiment, a person at a remote site may actively participate in the videoconference, rather than merely observing and/or optionally recording the deposition. According to this further embodiment, such a person may be connected via the network to the videoconference codec. This embodiment may include a VTC website 236 in communication with the Internet 220.

Figure 5A:
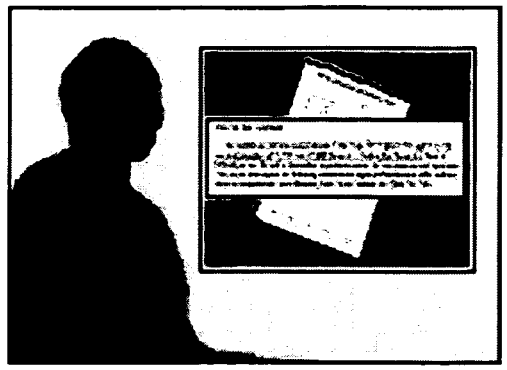
FIGS. 5A-D are various configurations of video capture according to embodiments of the present invention.
Figure 5B:
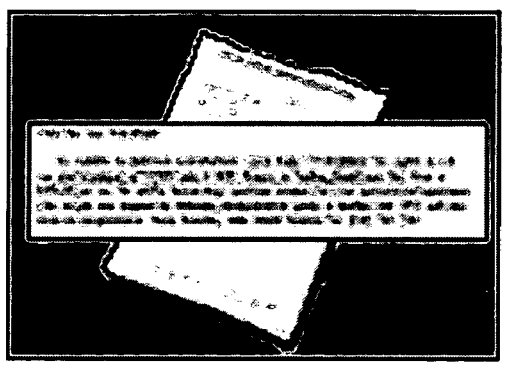
Figure 5C:
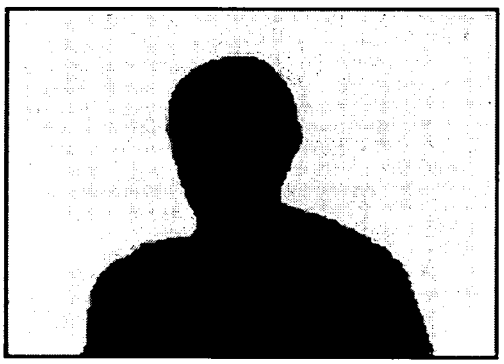
Figure 5D:
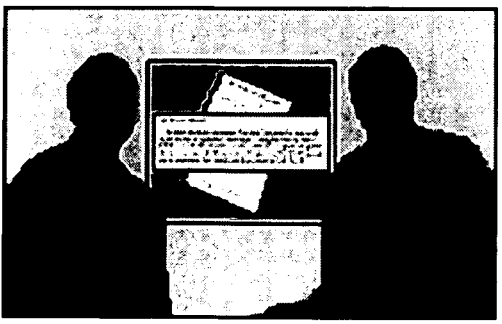

FIGS. 5A-D are various configurations of video capture according to embodiments of the present invention. More specifically, FIG. 5A is a "two-shot" of a witness or deponent and the over-the-shoulder exhibit display. FIG. 5B is a "one-shot" of the contents in the exhibit display. FIG. 5C is a "one-shot" configuration of the witness or deponent. As an alternative to the shot shown in FIG. 5B, the full-screen image can be fed at a higher resolution directly from the data source rather than through the camera. FIG. 5D is a "three-shot" configuration including the witness/deponent, exhibit display and the questioning attorney. These shots amount to a single, variable-sized window and are achieved on the fly using either an automated PTZ camera with presets or a cameraman using a zoom lens.

A two-camera embodiment of the present invention deploys a second camera and a portable video switch to include occasional one-shots of the questioning attorney as questions are being asked. As an alternative to the video switch there could be a separate recording of the questions so that important questions are edited in, later, when the video testimony is being prepared for a hearing or trial.

A second, large format display could be added for sophisticated videoconferenced depositions, so that the image of a remote attorney or witness appears on the second, large format display. That video image is primarily for the benefit of those in the room, to make the proceeding more realistic, as opposed to an image that would be recorded as part of the official video record.

A desktop system embodiment of the present invention is also disclosed. The desktop permits a desktop personal computer (PC) and a webcam to serve as the primary video recording device. In this embodiment a smaller over-the-shoulder exhibit display, wide-aspect or regular, ranging from about 20-36 inches measured diagonally, may be deployed. Various embodiments of the desktop system of the present invention may include one or more of the following features: (1) a high resolution camera instead of a low resolution webcam, (2) a high resolution pan/tilt/zoom camera with presets to enable two views, (i) both the deponent or attorney and display, i.e., a two-shot (see FIG. 5A) and (ii) "one shots", i.e., a view of the presenter/deponent (see FIG. 5C) or the exhibit display (see FIG. 5B), individually.

Figure 6:
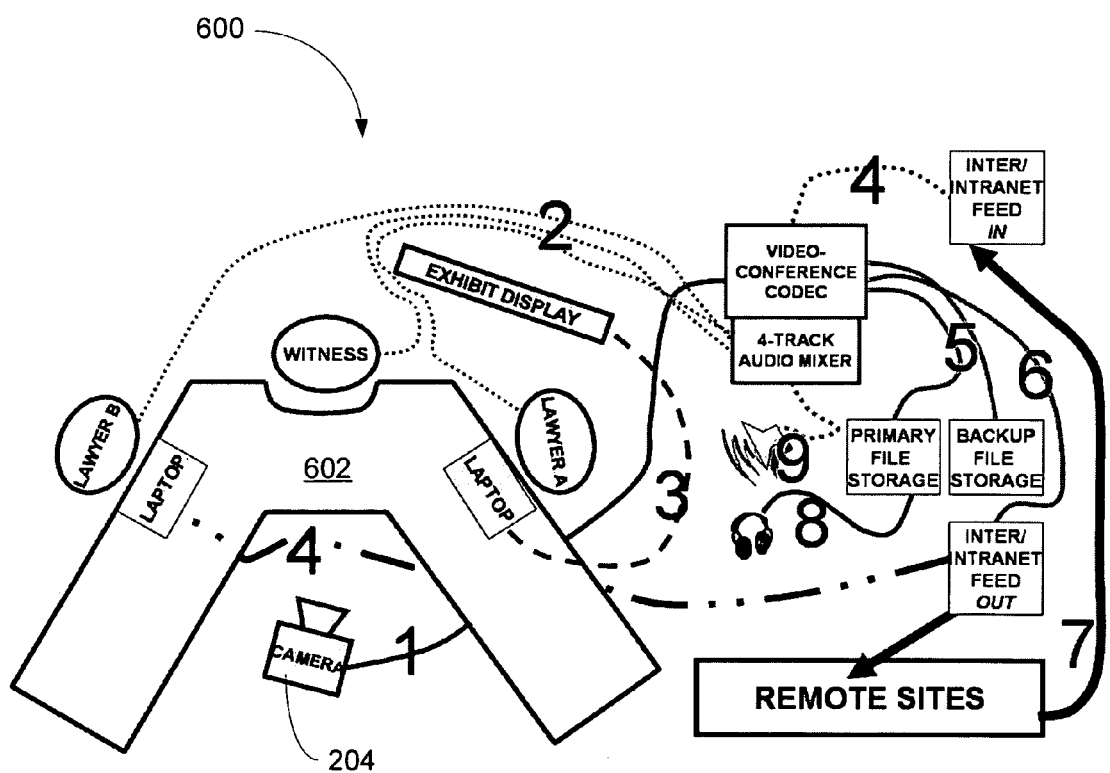
FIG. 6 is a diagram of system embodiment of the present invention, including a notched V-table as it might be used with a single video camera.

Still another embodiment of the system of the present invention may include a specially designed desk configured to optimize the video shots and the user experience. FIG. 6 is a diagram of a system 600 embodiment of the present invention, including a notched V-table 602 as it might be used with a single video camera 204 according to the present invention. Of course, other configurations of desks and tables, such as L- and 7 shaped, suitable for use with the method and system embodiments of the present invention will be readily apparent to those skilled in the art and are contemplated to be within the scope of the present invention.

FIGS. 7A-B are simplified diagrams comparing a conventional two-channel video deposition/presentation system 700 with an embodiment of the single video channel system 750 of the present invention. As shown in FIG. 7A, a conventional video deposition system 700 requires two video channels: one video channel 702 to carry the video camera 204 data and another video channel 704 to transmit the document or exhibit images. In contrast, the single video channel system 750 of the present invention only requires a single video channel 720 for transmitting the video camera 204 video that contains both the deponent 710 and the document/exhibit information as shown on a video display 202.

An embodiment of a turnkey system according to the present invention may include a tablet PC for annotating purposes if counsel do not bring their own. More complex and expensive annotation devices may be included as part of courtroom presentation systems, e.g., using a Boeckeler™ Pointmaker™ either as a tablet or touch screen. Such embodiments of annotation devices as used with the present invention may be employed optionally.

A further embodiment of the present invention may include software and/or hardware to enable one attorney to share a document, electronically, with another attorney before that document is displayed for the deponent. Note that many, if not most, existing court evidence presentation systems have this feature which can be integrated into various embodiments of the present invention. However, according to other embodiments of the present invention, it may be sufficient to merely exchange a paper copy of the digital document or employ other means to exchange a document before that document is displayed to the deponent.

A still further embodiment of the present invention may include user guides to assist attorneys and their staff to prepare content such as document callouts (blowups), timelines, charts, video clips, etc. for any of the various system embodiments disclosed herein. Optimal font sizes, screen resolutions, and settings would be included, as well as suggestions to help the attorney/presenters to select and/or improve their use of multimedia hardware. Such a user guide may include hints about using paper on demand, i.e., having witnesses use evidence on paper, in ring binders, in conjunction with their use of electronically displayed exhibits. User guides in accordance with the present invention may also describe setup and operational issues such as sound, lighting, etc., for optimal use of the present invention.

Still other embodiments that do not use a conventional video display/monitor are contemplated. Thus, deposition exhibits and the like that could be front or rear-projected onto a free-standing or wall-mounted screen or displayed electronically via chroma key are contemplated to be within the scope of the present invention. Chroma key and projected images are not preferred, however, because they inhibit the witness's natural body language and interaction with the exhibits.

A still further embodiment of the present invention may include a video search tool. The video search tool may be an optional software tool, not required for use of the system directly, but for use on computers of users who organize, view and edit the generated video files. The video search tool would enable searching out key words spoken during the deposition without first having to create a text file of the deposition. Nexidia Inc. of Atlanta, Ga. is developing a A/V search tool tailored to the legal community that could be used in accordance with this still further embodiment of the present invention. This may be a valuable feature for attorneys who want to do away with stenographic text transcripts altogether and work only with video files and with text transcriptions made from those files.

A still further embodiment of the present invention may include a speech-to-text (STT) search tool. The STT search tool may be an optional software tool, not required for use of the system directly, but for use by those who work with large video files. A properly deployed STT engine such as Dragon™ NaturallySpeaking™ could replicate many perceived advantages of stenographic reporting's real-time feature.

Some courtrooms that use evidence presentation technology are relatively poorly laid out for multimedia, often resulting in much greater complexity and expense to make the equipment fit the room and, thus, making presentation much more difficult. Embodiments of the present invention may improve the multimedia layout in courtrooms and reduce the complexity, resulting in a system that is less expensive to acquire, maintain and easier to use while increasing judge and juror comprehension.

A courtroom system embodiment of the present invention may include relatively larger screens than those employed in a conference room/deposition configured embodiment. Until the cost of very large format plasma displays (100-inch, for example) comes down, projection screens may be a cost-effective alternative. However, the present invention contemplates the use of any state-of-the-art video display technology, including those not yet commercially available. In the courtroom, the display, as in the deposition conference room should be positioned between the witness and the attorney. With this configuration or setup, counsel can also use the exhibit/video display for opening and closing statements when no witness is on the stand. By using video display/screen placements that are similar for depositions and trial, attorneys can more quickly learn presentation skills that are facilitated by the common placements. In addition, with the proper presenter/display, positioning the courtroom video camera can capture a complete record. A complete record will allow the use of video clips of testimony to be used during the trial, during closing statements, for jury deliberations and will maintain the entire record on appeal, not just the talking heads.

A system embodiment according to the present invention may be divided into two parts: components in front of the camera, i.e., examination/evidence presentation side and components behind the camera, i.e., recording/streaming side. Those two parts may be used separately, for example the digital document display part would greatly enhance legacy stenographic depositions. But the two parts used in combination is a presently preferred embodiment.

Components in front of the camera may include a large format display, e.g., recommended size range size in 4:3 and 16:9 aspect ratios: 32-60 inches measured diagonally, is positioned next to the deponent, facing the camera in what television terminology refers to as an "over-the-shoulder" position, because when viewed, the images on the display appear over the presenter's shoulder. Adjustable-height chairs and adjustable video display mounts can facilitate proper positioning. Typically, single or multiple laptops may be connected directly to the display via any suitable video display standard and connectors, e.g., video graphics array (VGA), HD15, high-definition multimedia interface (HDMI), or other connectors.

During a deposition or at trial, the questioning attorney typically displays exhibits such as documents, timelines, flow charts, video clips and photos using software common to courtroom evidence presentations: Adobe™ Acrobat™, Microsoft™ PowerPoint™, TrialPro™, Sanction™, TrialDirector™, Visionary, TrialMax, etc. Most conventional presentation software permits enlarging key parts of exhibits as well as annotations by counsel and the witness. But, embodiments of the present invention further permits manual annotation; that is the witness can look at and point to key parts of an exhibit and those "body language" annotations are recorded in real space and in the video capture screen as well, unlike conventional video and videoconferenced depositions.

An alternative embodiment of the system of the present invention may include a document camera that could be used alone or in concert with a computer to input images from paper documents onto the video display screen. However, this alternative embodiment is less preferred, because other preferred embodiments facilitate and hasten a paperless court system. According to still another alternative embodiment, an inexpensive document scanner could be locally available to digitize the occasional paper document someone forgot to scan earlier. According to still another alternative embodiment, a printer might be locally available to accommodate a party who needs a paper copy.

Embodiments of the present invention may be configured to enable any authorized party at the location of the presenter or online to connect into the system and make their own real-time recording of the proceeding. In cases where the video is the official record (as court rules and outmoded practices are eventually replaced by more advanced systems and methods such as the present invention) and no stenographic record is made, any party with a recording who needs a supplemental text transcript can hand deliver, mail, or email the audio file they recorded to a certified court transcriber to get a paper version of the proceeding. Note that several states and the federal courts already permit electronic recordings to replace stenography as the official record.

A further advantage of the embodiments of the present invention is the elimination of stenographic record-making at depositions, cutting out additional, unnecessary litigation costs. Any party wanting text transcripts can arrange to get them on their own, individually or sharing costs, using transcribers rather than more expensive shorthand reporters. As law firms learn how to use video as a tool, their need for text transcripts will likely diminish.

Still further embodiments of the present invention contemplate the incorporation of additional systems for controlling numbering (often referred to by its mechanical counterpart the "Bates stamp") of electronic documents as presented during the deposition. However, pre-marking the exhibit documents with control numbers prior to scanning may be a simpler embodiment according to the present invention. There appears to be a trend toward the e-filing of pleadings, which means that many documents are already digitized and put in document management systems before a case is filed.

Incidental paper documents that arise during depositions may be scanned and stamped during the proceeding or merely presented in paper format and identified on the record and control numbered or stamped later. If there are any "blind spots" for viewing images at the deposition recording site, small format LCD displays could be connected, using conventional technology used for additional LCD panels in courtrooms according to another embodiment of the present invention.

Embodiments of the present invention make it cheaper, faster and easier to present electronic evidence during depositions and to video record those depositions. That can promote the greater use of electronic exhibits and video testimony at trial, cutting trial time and costs for litigants and taxpayers. Because of the built-in videoconferencing function, it will be quicker to schedule depositions involving out-of-state participants, further reducing the duration and cost of discovery.

Images on the exhibit display screen may be shown in their native graphics file, e.g., formats such as TIF, PDF, AVI, MPG, JPEG, etc. But such images are stored in the record in the same video file format (examples: MPEG4, H.264), indeed in the very same file (on the same screen) as the deponent (talking head).

A further advantage of the embodiments of the present invention is the single video stream/file concept which permits cheaper transmission of the video signal over a network, e.g., the public Internet, as well as cheaper storage onto hard drives, optical (CD and DVD) drives, etc., resulting in the storage and or transmission of more evidence in a lower data volume. Because the hardware is integrated rather that replicated, the embodiments of the system of the present invention combine evidence presentation, video recording, video storage, videoconferencing and video streaming into a single system.

Because the embodiments of the present invention encourage digitizing evidence before depositions, it follows that the evidence will already be in digital format prior to trial, so that the cost savings spill over into the trial stage. It could help effect enormous savings for litigants and taxpayers who subsidize much of the trial process, yet are often excluded, because litigation costs too much.

As noted above, the embodiments of the present invention are not limited to the application of video depositions. The embodiments disclosed herein may be used to replace less sophisticated and poorly designed systems now being used in most federal courts and many state courts. Still another application may be in the distance learning field where the two-channel, disconnected display of presenter and rich media is now commonplace. Such conventional two-channel systems may include, e.g., MediaSite™, Breeze™, WebEx™, Accordent™ and Microsoft™ Producer™. The products' interfaces also use two main windows rather than one for displaying the talking head and rich media. (These products may also have additional windows for other collaboration and interaction functions.)

Further embodiments of the present invention include business methods. The methods could be licensed to manufacturers and/or integrators who would offer complete turnkey systems based on the methods and systems disclosed herein. The method alone, without hardware, could be licensed to individual users who want to configure their own equipment variations.

Turnkey system embodiments of the present invention could be sold or licensed to court reporting companies who could offer the invention in much the same way many already offer optional video recording and videoconferencing. The present invention could also be licensed to law firms who want to produce their own depositions and use the equipment for other purposes such as continuing legal education (CLE), on-line collaboration with other attorneys and clients. Additionally, systems according to embodiments of the present invention could be licensed and sold to any vertical market as an alternative to dual channel/dual window videoconferencing and streaming systems.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A method for audio/video (A/V) capturing, streaming, recording and playback, comprising:
   framing at least one person and a video display in a video camera field of view;
   selectively displaying rich media on the video display;
   capturing A/V signals of the at least one person and the rich media using a video camera, wherein the rich media comprises legible text and/or graphics within the video camera field of view; and
   generating a single A/V feed from the captured A/V signals without any additional video synchronized processing, the single A/V feed being configured for recording, playback and streaming.

2. The method according to claim 1, further comprising playing the single A/V feed.

3. The method according to claim 2, wherein playing the single A/V feed comprises playing the single A/V feed in a single window or frame on a video display and speaker system.

4. The method according to claim 1, further comprising recording the single A/V feed.

5. The method according to claim 1, further comprising streaming the single A/V feed.

6. The method according to claim 1, wherein framing at least one person and a video display in a camera field of view further comprises framing a deponent with the video display configured to appear over-the-shoulder of the deponent.

7. The method according to claim 1, wherein framing comprises adjusting relative placement of the at least one person and the video display within the camera field of view.

8. The method according to claim 1, wherein framing comprises adjusting at least one of: zoom, tilt and pan of the camera.

9. The method according to claim 1, wherein selectively displaying legible rich media comprises displaying at least one of: magnified, annotated or highlighted portions of the selected rich media.

10. The method according to claim 1, wherein selectively displaying legible rich media comprises selectively displaying legal proceeding exhibits.

11. The method according to claim 1, wherein generating a single A/V feed comprises generating a digital A/V feed.

12. The method according to claim 1, further comprising viewing the single A/V feed in a single window or frame at a remote location.

13. The method according to claim 1, further comprising providing the single A/V feed as video on demand.

14. The method according to claim 1, further comprising providing the single A/V feed as streaming video.

15. An audio/video (A/V) capturing, streaming, recording and playback system, comprising:
   a video display;
   a video camera configured for capturing A/V signals of a person and the video display within a field of view of the video camera; and
   the video display configured to selectively display rich media, wherein the rich media comprises legible text and/or graphics from within the field of view of the video camera, generating a single A/V feed from the caputured A/V signals without any additional video synchronized processing, the single A/V feed being configured for recording, playback, and/or videoconferencing and/or streaming.

16. The system according to claim 15, wherein the video display is configured to appear over-the-shoulder of the person within the field of view.

17. The system according to claim 15, wherein the video display comprises a 16:9 aspect ratio.

18. The system according to claim 15, wherein the rich media comprise text documents.

19. The system according to claim 15, wherein the rich media comprise legal proceeding exhibits.

20. The system according to claim 15, further comprising:
   a video teleconference compressor/decompressor (codec) configured for receiving the captured A/V signals from the video camera and compressing the captured A/V signals to obtain a single A/V feed; and
   a web server in communication with the video teleconference codec and configured for receiving the single A/V feed, the web server further configured for at least one of: providing the single A/V feed as a downloadable video on demand file or transmitting the single A/V feed as streaming video.

21. The system according to claim 20, further comprising:
   a plurality of microphones; and
   an audio mixer in communication with the plurality of microphones and the first video teleconference codec, the audio mixer being configured for mixing a plurality of audio channels for compression into the single A/V feed.

22. The system according to claim 20, further comprising a remote computer in communication with a network and configured for receiving the single A/V feed and selectively decompressing and playing the A/V signals.

23. A method for audio/visual (A/V) capturing, streaming, recording and playback of witness testimony, comprising:

providing an A/V capturing, streaming, recording and playback system, comprising:
- an exhibit monitor configured to selectively display legible rich media exhibits;
- a video camera configured for capturing A/V signals of a witness and the exhibit monitor within a field of view of the video camera; and
- the exhibit monitor configured for selectively displaying exhibits;

positioning a witness and the exhibit monitor within the field of view of the video camera;

selectively displaying the exhibits on the exhibit monitor;

selectively questioning the witness in reference to the selectively displayed exhibits; and simultaneously capturing A/V testimony from the witness and the selectively displayed exhibits using the video camera, wherein the exhibits comprise legible text and/or graphics within the field of view of the video camera, generating a single A/V feed from the captured A/V signals without any additional video sychronized processing, the single A/V feed being configured for recording, playback, and/or videoconferencing and/or streaming.

24. The method according to claim 23, further comprising compressing the captured A/V testimony to generate a single A/V feed.

25. The method according to claim 24, further comprising transmitting the single A/V feed over a network.

26. The method according to claim 24, further comprising receiving the single A/V feed at a location remote from the witness.

27. The method according to claim 26, wherein receiving the single A/V feed comprises downloading video on demand for selective playback.

28. The method according to claim 26, wherein receiving the single A/V feed comprises receiving streaming video for immediate playing or recording and selective playback.

29. The method according to claim 26, wherein providing an A/V capturing, streaming, recording and playback system, further comprises providing a video teleconference compressor/decompressor (codec) configured for receiving the captured A/V testimony from the video camera and compressing the captured A/V testimony to obtain a single A/V feed.

30. The method according to claim 29, wherein providing an A/V capturing, streaming, recording and playback system, further comprises providing a web server in communication with the video teleconference codec configured for receiving the single A/V feed, the web server further configured for at least one of: providing the single A/V feed as a downloadable video on demand file, or transmitting the single A/V feed as streaming video over a network.

31. The method according to claim 30, wherein providing an A/V capturing, streaming, recording and playback system, further comprises providing a multimedia computer for playing the single A/V feed.

32. The method according to claim 23, further comprising playing the captured A/V testimony on at least one separate video display and speaker system.

* * * * *